Sept. 26, 1944.  W. W. DUNNICLIFF  2,358,853
CRUTCH
Filed Sept. 1, 1943  2 Sheets-Sheet 1

INVENTOR
Wm. W. Dunnicliff
BY
ATTYS

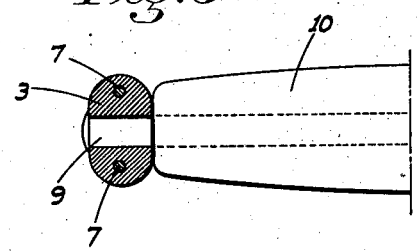
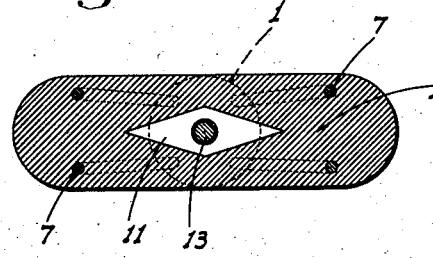
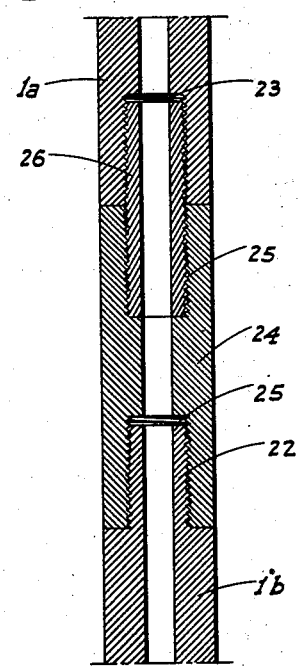
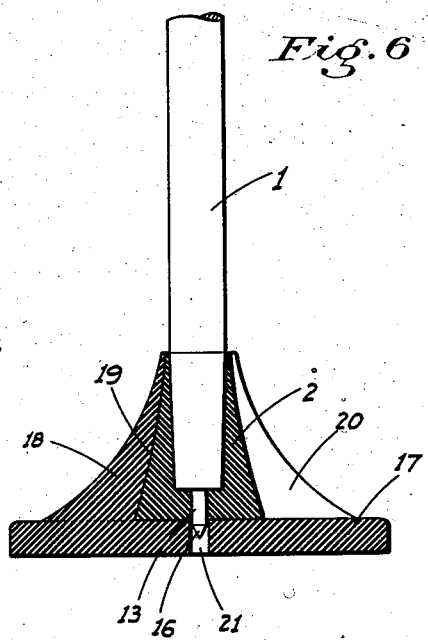
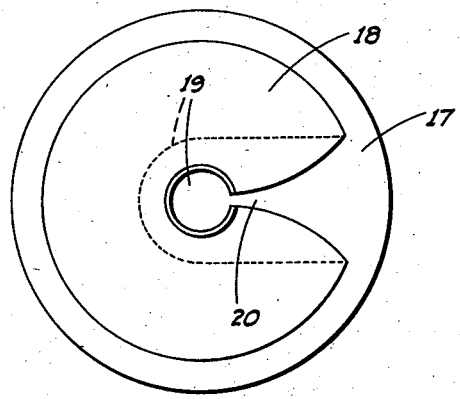
INVENTOR
Wm. W. Dunnicliff

Patented Sept. 26, 1944

2,358,853

UNITED STATES PATENT OFFICE 2,358,853

CRUTCH

William W. Dunnicliff, Friant, Calif.

Application September 1, 1943, Serial No. 500,758

4 Claims. (Cl. 135—53)

This invention relates to crutches, one object being to provide a crutch made in monolithic of a suitable plastic and which will be strong, of smooth and neat appearance and which, on account of the nature of the material of which it is made, can be put out in a variety of colors to match the attire of the user.

Other objects are to provide a crutch formed with a deep arm-pit cradle so that the user can stoop over without the crutch slipping from place; one having an adjustable hand-grip so that the crutch may be adapted for use with persons of different arm lengths; one provided with an optionally ground engaging spike for use when the ground is frozen or slippery; and one provided with an attachment mounted at will with an enlarged flexible foot or shoe for use when ground conditions render such use advisable or necessary, as when the ground is covered with snow or is relatively soft.

Another object is to provide a crutch having incorporated in the leg thereof an adjustable or interchangeable extension to provide a rough adjustment for leg length and including means to provide an additional accurate or close adjustment for leg lengths. Such a crutch is adapted for use as a dealer's or salesman's sample, and enables any prospective purchaser to be readily and accurately fitted for height or length of the crutch.

These objects I accomplish by means of such structure and relative arrangement of parts as will fully appear by a perusal of the following specification and claims.

In the drawings similar characters of reference indicate corresponding parts in the several views:

Figure 3 is a fragmentary enlarged cross section on line 3—3 of Fig. 2.

Figure 4 is a similar view on line 4—4 of Fig. 2.

Figure 5 is a fragmentary enlarged sectional elevation of the leg of a crutch provided with a removable and adjustable extension.

Figure 6 is a fragmentary enlarged sectional elevation of the lower portion of the crutch leg showing a snow shoe mounted thereon.

Figure 7 is a top plan view of the shoe detached.

Referring now more particularly to the characters of reference on the drawings, the crutch comprises a leg 1 preferably of cylindrical form and having a rubber thimble or foot 2 mounted on its lower end, this thimble flaring outwardly to its lower end.

Figure 1:
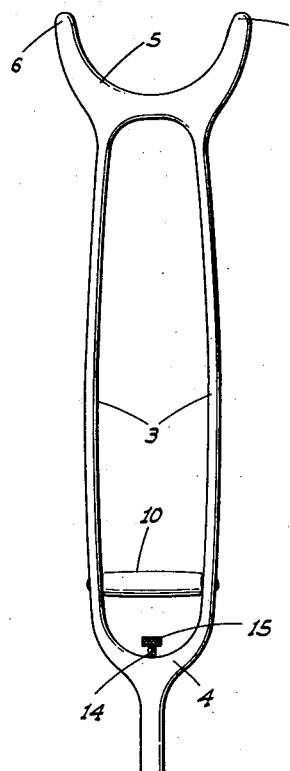
Figure 1 is a side elevation of my improved crutch.
Figure 2:
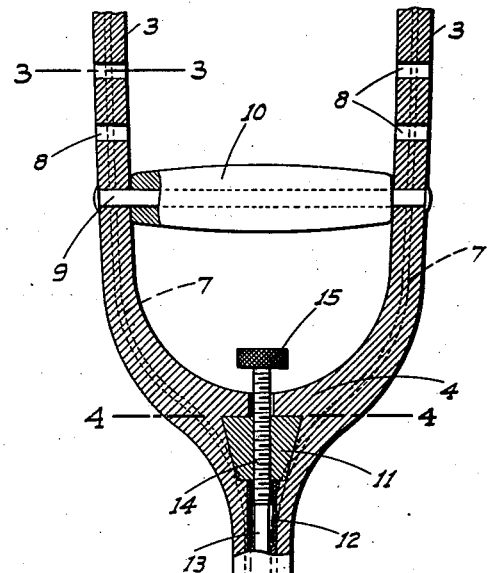
Figure 2 is a fragmentary enlarged sectional elevation of the crutch showing sundry features of construction.

Above the leg the crutch is formed with a pair of spaced side bars 3 preferably of oval form in cross section, as shown in Fig. 3, and disposed in symmetrical and preferably slightly concave relation to each other, as shown in Fig. 1. These bars at the lower end integrally join the upper end of the leg with a substantially U-shaped crotch 4, the bars being symmetrically disposed relative to the leg. At their upper end the bars merge into the base of a cradle 5 adapted to engage the arm pit of the user; the cradle having rounded tips 6 and being relatively deep so that the cradle will not be liable to slip from place when the user stoops or bends over. The length of the crutch from the cradle to the crotch 4 is greater than the length of an arm from under the arm pit to the finger tips.

The main parts of the crutch as above described are made in monolithic form of a suitable plastic, which is preferably reinforced from top to bottom with suitably disposed reinforcing rods or wires 7. By so doing the crutch may be of relatively shallow dimensions in cross section, while having ample strength and rigidity. The material of which the crutch is made enables the same to be perfectly smooth on all its exterior exposed surfaces and to be colored through as may be desired. The bars 3 adjacent the crotch are formed with a series of alined vertically spaced holes 8 to receive the axial rod 9 of a subsantially cylindrical hand grip 10 which extends between the bars. In this manner the grip may be disposed at proper positions relative to the arm pit cradle to suit the arm length of any individual user.

Figure 8:
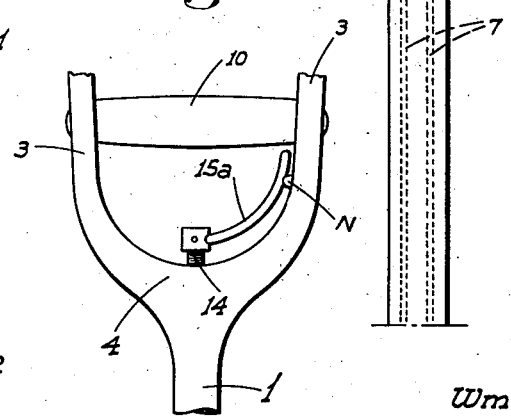
Figure 8 is a fragmentary elevation showing a modified spike-rod adjusting means.

Embedded in the crutch symmetrical with the leg and just below the crotch is a nut 11, preferably of elongated diamond form in plan, as shown in Fig. 4, to give a relatively great bearing area in the crutch lengthwise of the crotch portion so that the nut is not liable to loosen and tend to turn. The leg from below the nut to its lower end is provided with a straight bore or inlaid tube 12 through which a rod 13 is slidable. The upper end portion of this rod is threaded as at 14, and projects through the nut. At its upper end, the rod may have a finger knob 15 for turning the same, or a lever-type rod 15a may be used as shown in Fig. 8. In the latter case, the rod 15a extends up and follows close to one of the bars 3 on the inside to a point adjacent the handle 10 at whatever level the latter may be set. The rod 15a may be retained in this position by suitable means, such as nubs N projecting from bar 3.

The lower end of the rod is adapted to project through the bottom of the thimble 2 and is provided on said end with a sharp point 16 forming a ground engaging spike. By turning the rod 13 one way or the other the spike may be retracted clear of the thimble or foot, or advanced any desired amount, depending on whether or not its use is desired and upon the particular ground conditions encountered at the time. Such adjustment may be made by the user without removing the crutch, since the fingers of the hand engaged with the grip 10 may readily manipulate either the knob 15 or lever rod 15a. For use when the ground is soft or covered with snow, I provide a foot attachment or shoe preferably formed of flexible resilient rubber. This shoe comprises a relatively large, flat base 17 preferably of circular form and having an upstanding sleeve 18 as high as the thimble 2 and of exteriorly tapering form. This sleeve is formed with a downwardly flaring socket 19 conforming in size and shape to the exterior contour of the thimble 2. The sleeve also is provided with a radial slit 20 extending from top to bottom of the socket and of gradually winding form, as shown in Fig. 7, so that the thimble may be inserted into the socket from one side and will then be removably retained in place by the grip of the rubber of the sleeve on the thimble. The base 17 is provided with a central hole 21 so that the spike may be projected below the base if desired. While the entire shoe is made of rubber, the base is preferably of a somewhat harder nature than the sleeve.

In Fig. 5, I illustrate an adjustable leg construction adapted to be incorporated in the sample crutch of a dealer or salesman. In this construction the leg is made in two sections 1a and 1b, the latter section being preferably relatively short and near the foot. The section 1b is provided with an upstanding central threaded boss 22 adapted to removably seat in a tapped socket 23 in the section 1a. By advancing or retracting the boss short differences in the height of the crutch may be obtained to suit any particular user.

When a greater variation in height is necessary the sections are uncoupled and any one of a number of short extension pieces 24, of different length, may be disposed therebetween; each piece having opposed tapped sockets 25 in its ends to receive the boss 22 and a threaded coupling nut 26 respectively, the latter being screwed into the socket 23. In this manner a rough adjustment for length is obtained by means of the extension 24, an accurate adjustment being obtained by advancing or retracting the same relative to the boss 22 or nipple 26. When such accurate adjustment has been obtained the total desired length of the crutch or leg is measured and a crutch with a one-piece solid leg is then cut to this length for the user.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a crutch, a foot normally engageable with the ground, a separate relatively large ground engaging shoe, and means to facilitate removably mounting the shoe on the foot.

2. In a crutch having a leg, a thimble on the lower end of the leg forming a ground engaging foot, a relatively large ground engaging shoe, and an upstanding sleeve on said shoe having a socket to removably receive the thimble.

3. In a crutch having a leg, a thimble on the lower end of the leg forming a ground engaging foot, and tapering on its outer periphery from its lower end to its top, a relatively large ground engaging shoe comprising a base and a flexible sleeve upstanding from the base; the sleeve having a socket shaped to fit the thimble and being slit down one side to removably receive the thimble into the socket from said side.

4. In a crutch, a leg having a ground engaging foot thereon, a rod extending lengthwise through the leg to its upper end for longitudinal movement relative thereto, a ground engaging spike on the lower end of the rod, a nut secured in the crutch through which a portion of the rod is threaded and a head on the rod above the leg for turning said rod.

WILLIAM W. DUNNICLIFF.